United States Patent
Hamill et al.

(10) Patent No.: US 7,676,073 B2
(45) Date of Patent: Mar. 9, 2010

(54) SYSTEM AND METHOD FOR REDUCING CIRCULAR ARTIFACTS IN TOMOGRAPHIC IMAGING

(75) Inventors: James J. Hamill, Knoxville, TN (US); David D. Faul, Knoxville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 812 days.

(21) Appl. No.: 11/550,445

(22) Filed: Oct. 18, 2006

(65) Prior Publication Data

US 2008/0056549 A1 Mar. 6, 2008

Related U.S. Application Data

(60) Provisional application No. 60/840,763, filed on Aug. 29, 2006.

(51) Int. Cl.
*G06K 9/00* (2006.01)
*A61B 6/00* (2006.01)

(52) U.S. Cl. .............................. 382/128; 382/275; 378/4

(58) Field of Classification Search ................. 382/100, 382/128, 129, 130, 131, 132, 133, 134, 168, 382/174, 181, 190–194, 199, 203, 220, 232, 382/255, 260, 274, 275, 276, 285, 291, 305, 382/312; 378/8, 98.8, 19, 14, 4; 250/367; 600/427

See application file for complete search history.

(56) References Cited

U.S. PATENT DOCUMENTS

| | | | | |
|---|---|---|---|---|
| 5,307,264 A * | 4/1994 | Waggener et al. | ............. | 378/14 |
| 5,768,331 A * | 6/1998 | Gordon et al. | ................ | 378/19 |
| 6,490,476 B1 * | 12/2002 | Townsend et al. | ........... | 600/427 |
| 6,928,144 B2 * | 8/2005 | Li et al. | ...................... | 378/98.8 |
| 6,973,157 B2 * | 12/2005 | Claus | ............................ | 378/8 |
| 6,979,826 B2 * | 12/2005 | Ikhlef | .......................... | 250/367 |
| 7,054,475 B2 * | 5/2006 | Edic et al. | .................... | 382/131 |
| 7,415,145 B2 * | 8/2008 | Hsieh et al. | ................. | 382/131 |

* cited by examiner

*Primary Examiner*—Seyed Azarian
(74) *Attorney, Agent, or Firm*—Peter L. Kendall

(57) ABSTRACT

A method of reducing ring artifacts in tomographic images including providing an original digitized projection measurement comprising a plurality of intensities corresponding to a domain of points on an 2-dimensional grid, operating on said original projection measurement with a filter wherein features of high radial frequency and low angular frequency are attenuated, forming a weighted mixture of said filtered projection measurement and said original projection measurement wherein ring artifacts in said original tomographic image are substantially reduced, and reconstructing the projection measurement to form a tomographic image. Alternatively, a first tomographic image is reconstructed from said original projection measurement, a second tomographic image is reconstructed from said filtered projection measurement, and a weighted mixture is formed from said first tomographic image and said second tomographic image.

29 Claims, 7 Drawing Sheets

SYSTEM AND METHOD FOR REDUCING CIRCULAR ARTIFACTS IN TOMOGRAPHIC IMAGING

CROSS REFERENCE TO RELATED UNITED STATES APPLICATIONS

This application claims priority from: "Apparatus for Reducing Circular Artifacts in Tomographic Imaging", U.S. Provisional Application No. 60/840,763 of Hamill, et al., filed Aug. 29, 2006, the contents of which are incorporated herein by reference.

TECHNICAL FIELD

The invention is directed to reducing the magnitude of ring and band errors in X-ray CT images, and in particular, PET-CT images.

DISCUSSION OF THE RELATED ART

Many tomographs, for example X-ray CT tomographs, contain a fixed set of detectors which revolve around the patient on nearly circular arcs. If some of the detectors are affected by a systematic measurement multiplicative (or gain) or offset (background) error, the result is an error in the sinogram. After reconstruction, the artifact is manifested as circles or partial circles in the image. These are known as ring artifacts. Physicians who draw diagnostic inferences from the images are distracted by these artifacts, which in some cases can mask important diagnostic information.

Equally distracting are band artifacts that are caused by groups of neighboring detectors that have similar errors. The band appears as a broader ring than that caused by a single deviant detector.

The ring artifacts can be reduced in any of several ways: by fixing the measurement error if possible; by performing digital corrections to the sinogram, for example interpolating across the affected regions of the sinogram to provide a better estimate of the correct sinogram; and finally, by performing digital corrections to the image itself.

The susceptibility of the tomograph to ring artifacts is particularly severe when the X-ray flux at the detector is lower than usual, for example in the low-dose conditions or when the patient is obese. The leakage current of the x-ray detectors is often a significant part of the signal at low x-ray flux and the detector channel gain can vary.

SUMMARY OF THE INVENTION

Exemplary embodiments of the invention as described herein generally include methods and systems for reducing ring and band errors in tomographic images.

According to an aspect of the invention, there is provided a method of reducing ring artifacts in tomographic images including providing an original digitized projection measurement comprising a plurality of intensities corresponding to a domain of points on an 2-dimensional grid, operating on said original projection measurement with a filter wherein features of high radial frequency and low angular frequency are attenuated, forming a weighted mixture of said filtered projection measurement and said original projection measurement wherein ring artifacts in said original tomographic image are substantially reduced, and reconstructing the projection measurement to form a tomographic image.

According to a further aspect of the invention, the projection measurement is an X-ray projection measurement from a computed tomography instrument.

According to a further aspect of the invention, the X-ray projection measurement has been interpolated to form a parallel-beam 180-degree sinogram.

According to a further aspect of the invention, the X-ray projection measurement has been interpolated to form a parallel-beam 360-degree sinogram.

According to a further aspect of the invention, the X-ray projection measurement has been interpolated to form a fan-beam projection sinogram.

According to a further aspect of the invention, operating on said original projection measurement comprises convolving said original projection measurement with said filter.

According to a further aspect of the invention, operating on said original projection measurement comprises transforming said original projection measurement from a measurement space representation into a frequency space representation, filtering said frequency space representation, and transforming filtered frequency space representation back to the measurement space representation.

According to a further aspect of the invention, the method comprises enlarging said original projection measurement, wherein periodicities needed for a valid transformation into a frequency space representation are provided.

According to a further aspect of the invention, enlarging said original projection measurement comprises radially reversing the original projection measurement and reversing the radially reversed projection measurement about a center of rotation.

According to a further aspect of the invention, enlarging said original projection measurement comprises padding the original projection measurement with zeroes at the edges.

According to a further aspect of the invention, the transformation to frequency space is a Hartley transformation.

According to a further aspect of the invention, the transformation to frequency space is a Fourier transformation.

According to a further aspect of the invention, the filter is one minus the product of a radial Butterworth filter and an angular lambda function, said filter equivalent to the form.

$$1 - \left(1 - \frac{1}{1 + \left(\frac{|((kr + nr) \bmod (2 \times nr)) - nr|}{kr_0}\right)^{2 \times N}}\right) \times \Lambda\left(\frac{k\varphi \bmod(2 \times n\varphi)}{k\varphi_0}\right)$$

wherein $$\Lambda(\arg) = \begin{cases} 1 - |\arg| & \text{where } |\arg| < 1 \\ 0 & \text{elsewhere} \end{cases},$$

and wherein kr and kφ are frequency space analogues of radial and angular coordinates, respectively, nr and nφ are the number of radial and angular bins, respectively, N is a predetermined exponent that adjusts the steepness of the filter edge, $kr_0$ adjusts the radial cutoff frequency, and $k\varphi_0$ adjusts the angular cutoff frequency.

According to a further aspect of the invention, the weighted mixture of said filtered projection measurement and said original projection measurement is equivalent to the form w(ir)×S'(ir,iφ)+(1−w(ir))×S(ir,iφ), wherein S(ir, iφ) is the original projection measurement, S'(ir,iφ) is the filtered projection measurement, ir and iφ represent radial and angular coordinates, respectively, and w(ir) is a weighting function that is a Butterworth filter equivalent to the form $$\frac{1}{1+\left(\frac{|ir-\text{center}|}{ir_0}\right)^{2\times N}},$$

wherein center represents the original projection measurement center, N is a predetermined exponent that adjusts the steepness of the filter edge, and $ir_0$ adjusts the radial cutoff value.

According to another aspect of the invention, there is provided a method of reducing ring artifacts in tomographic images including providing an original digitized projection measurement comprising a plurality of intensities corresponding to a domain of points on an 2-dimensional grid, filtering said projection measurement image with a filter that is a low-pass filter in the radial direction at near-zero angular frequency, passes all frequencies at high angular frequencies, and changes linearly between said two behaviors at intermediate angular frequencies, reconstructing a first tomographic image from said original projection measurement, reconstructing a second tomographic image from said filtered projection measurement, and forming a weighted mixture of said first tomographic image and said second tomographic image wherein ring artifacts resulting from said original projection measurement are substantially reduced.

According to a further aspect of the invention, near-zero-angular-frequency low pass radial filter is equivalent to $$\frac{1}{1+\left(\frac{\rho}{\rho_0}\right)^{2N}}$$

wherein $\rho$ is a radial value, $\rho_0$ is a cutoff radius, and N is a predetermined exponent value.

According to a further aspect of the invention, the filter for non-zero angular frequencies is equivalent to $$\frac{i}{i_0}+\left(1-\frac{i}{i_0}\right)\times f(\rho),$$

wherein $f(\rho)$ is said near-zero-angular-frequency radial filter, i is an angular value and $i_0$ is an angular cutoff.

According to another aspect of the invention, there is provided a program storage device readable by a computer, tangibly embodying a program of instructions executable by the computer to perform the method steps for reducing ring artifacts in tomographic images.

DETAILED DESCRIPTION OF THE PREFERRED EMBODIMENTS

Figure 1:
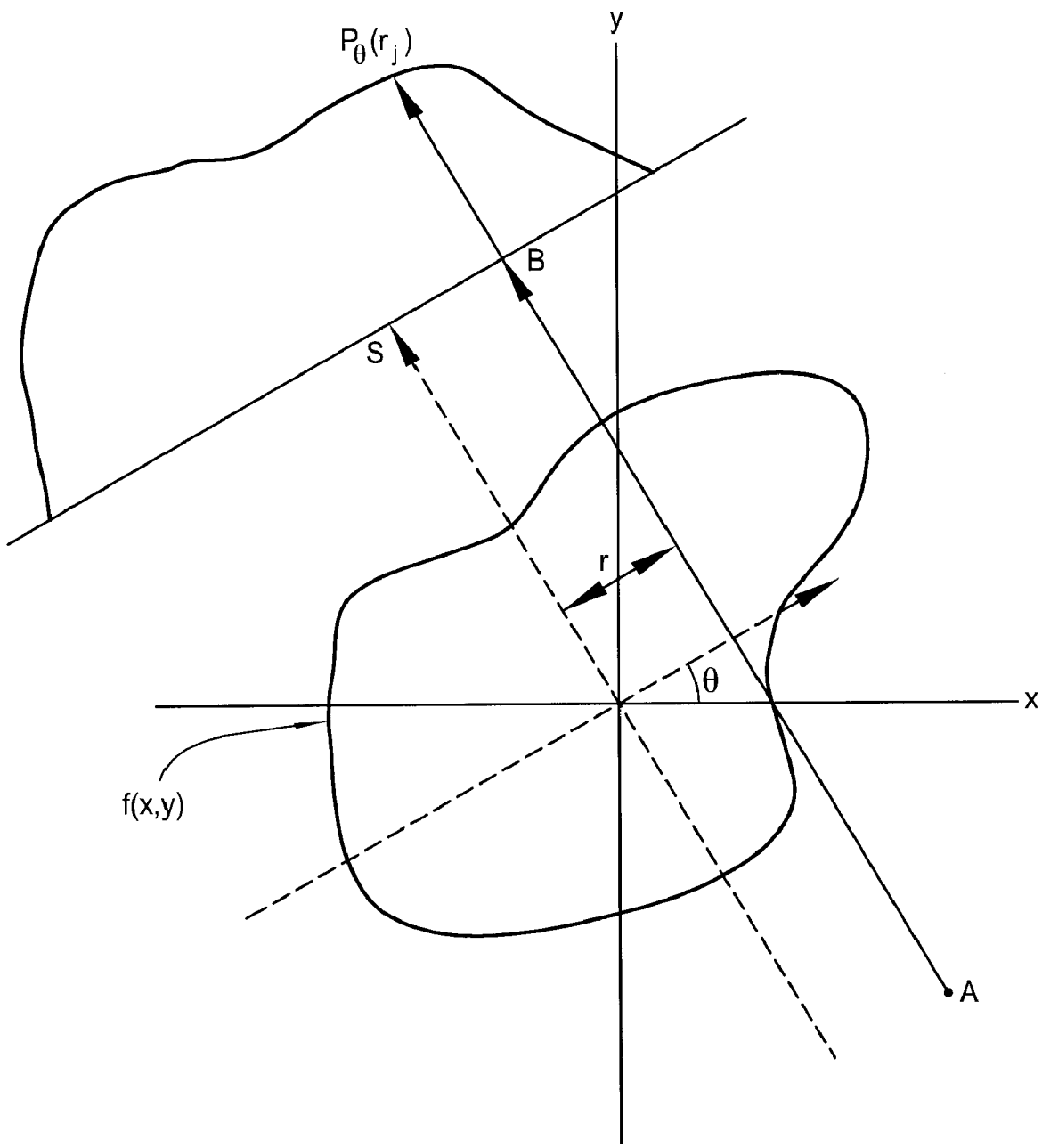
FIG. 1 illustrates the parallel beam geometry of an exemplary tomographic apparatus.

Exemplary embodiments of the invention as described herein generally include systems and methods for reducing ring and band errors in tomographic images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a patient collected by computer tomography, magnetic resonance imaging, ultrasound, or any other medical imaging system known to one of skill in the art. The image may also be provided from non-medical contexts, such as, for example, remote sensing systems, baggage inspection, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Tomography involves the generation of a two-dimensional image representing a slice or section through a three-dimensional object. A device used in tomography is called a tomograph, while the resulting image is known as a tomogram. Tomography is based on the mathematical procedure called tomographic reconstruction.

In a conventional medical X-ray tomography, a sectional image through a body can be made by moving an X-ray source and the film in opposite directions during the exposure. Consequently, structures in the focal plane appear sharper, while structures in other planes appear blurred. By modifying the direction and extent of the movement, different focal planes can be selected which contain the structures of interest.

More modern variations of tomography involve gathering projection data from multiple directions and feeding the data into a tomographic reconstruction algorithm processed by a computer. Different types of signal acquisition can be used in similar calculation algorithms in order to create a tomographic image. With current technology, tomograms are derived using several different physical phenomena including X-rays, gamma rays, positron-electron annihilation reaction, nuclear magnetic resonance, ultrasound, electrons, and ions. These yield CT, SPECT, PET, MRI, ultrasonography, 3d-TEM, and atom probe tomograms, respectively. Some recent advances rely on using simultaneously integrated physical phenomena, e.g. X-rays for both CT and angiography, combined CT/PET and combined MRI/PET.

The mathematical basis for tomographic imaging was laid down by Johann Radon, and is applied in computed tomography to obtain cross-sectional images of patients. Many different reconstruction algorithms exist, which involve either an explicit inverse of the Radon transform, and an approximation to the inverse transform.

FIG. 1 illustrates the parallel beam geometry of an exemplary tomographic apparatus. The projection of an object, represented by f(x, y), at a given angle, θ is made up of a set of line integrals, represented by parallel rays AB. (In practice the data are often acquired as a fan of rays or a cone of rays.) Each ray can be characterized by its angular offset θ and its radial displacement r from a line S through the center of the coordinate system. In X-ray CT, the line integral represents the total attenuation of the beam of x-rays as the beam travels in a straight line through the object. The resulting image is a 2D (or 3D) model of the attenuation coefficient. The data to be collected can be considered as a function of position r and projection angle θ. This is repeated for various angles. For monoenergetic photons, attenuation occurs exponentially in tissue:

$$I = I_0 \exp(-\int \mu(x) ds),$$

where $\mu(x)$ is the attenuation coefficient at position x along the ray path for a photon of a given energy, $I_0$ is the intensity of the beam in the absence of interposing material, and I is the intensity when material is interposed. Therefore the integral of the attenuation coefficients on a ray at position r, on the projection at angle θ, is given by the following line integral, which is commonly and simply called the projection:

$$p(r, \theta) = \ln(I_0/I) = \int \mu(x, y) ds.$$

Using the coordinate system of FIG. 1, the value of r onto which the point (x,y) will be projected at angle θ is given by:

$$x \cos \theta + y \sin \theta = r;$$

so the above attenuation equation can be rewritten as $$R_\theta\{f\}(r) \equiv p(r, \theta) = \int_{-\infty}^{\infty} \int_{-\infty}^{\infty} f(x, y) \delta(x\cos\theta + y\sin\theta - r) dx dy,$$

where f(x,y) represents $\mu(x,y)$, and $\delta(x \cos \theta + y \sin \theta - r)$ is a Dirac delta function. This function is known as the Radon transform of the 2D object. In the context of tomography the Radon transform data is often called a sinogram because the Radon transform of a delta function is the characteristic function of the graph of a sine wave. Consequently the Radon transform of a number of small objects appears graphically as a number of blurred sine waves with different amplitudes and phases.

According to the projection-slice theorem, if there are an infinite number of one-dimensional projections of an object taken at an infinite number of angles, the original object, f(x,y) can be reconstructed. So obtaining f(x,y) from the above equation means finding the inverse Radon transform. There are many methods well known in the art of tomography for computing an approximate inverse Radon transform.

A method and system according to an embodiment of the invention can reduce ring and band artifacts by modifying the measurements from which the image is derived. Given a set of measurements $m(\vec{d})$, where the symbol $\vec{d}$ represents detection bins at some stage in the data handling, the measured values $m(\vec{d})$ are modified according to a transformation of the form $$m'(\vec{d}) = w_1(\vec{d}) O\{m(\vec{d})\} + w_2(\vec{d}) m(\vec{d}),$$

where O{ } represents an operator which attenuates features of high radial frequency and either stationary in angle or of low angular frequency, and $w_1$ and $w_2$ are weighting coefficients.

Figure 2:
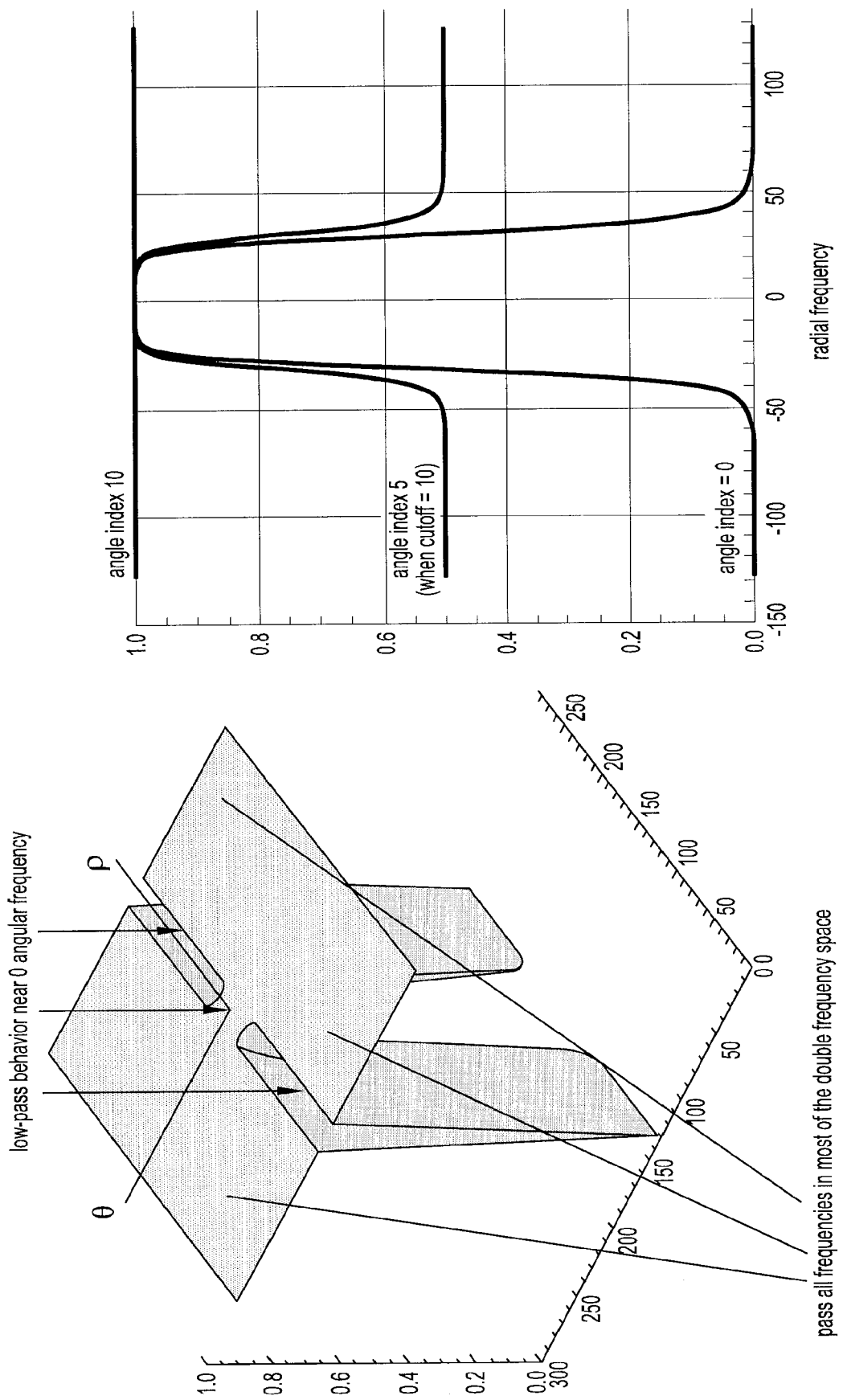
FIGS. 2(*a*)-(*b*) depict an exemplary ring artifact removal filter, according to an embodiment of the invention.

An exemplary filter according to an embodiment of the invention works on each sinogram plane in frequency space. Each sinogram plane is padded in angle, observing the necessary reflections to make it a 360-degree entity, and is padded in a radial direction with a spatially reversed version of the sinogram so the sinogram varies continuously as it wraps around. The sinogram is transformed into a 2D-frequency space. Exemplary frequency transformations are the Fourier transform and the Hartley transform. The transformed sinogram is multiplied by a filter that is a low-pass filter in the radial direction but only near zero angular frequency, passes all frequencies at high angular frequencies, and changes linearly between the two behaviors at intermediate angular frequencies. FIGS. 2(a)-(b) depict an exemplary ring artifact filter according to an embodiment of the invention. FIG. 2(a) is a 3D perspective view of the filter as a function radial frequency and angular frequency, and FIG. 2(b) shows several superimposed radial frequency graphs at different angular frequencies. According to other embodiments of the invention, the sinogram can be filtered in measurement space, without being transformed into frequency space.

An exemplary apparatus for reducing ring and band artifacts is a digital computer or an equivalent device, connected to a tomographic scanner through a computer network or an equivalent data conduit. For those embodiments of the invention that involve transforming to frequency space and back, the computing device should be capable of performing these digital transformations between arrays stored in discrete sinogram space and discrete frequency space. Any suitable transformation can be used, for example the Fourier transform and the Hartley transform.

The Hartley transform is an integral transform which shares some features with the Fourier transform, but which, in the discrete case, multiplies the integral kernel by $$\cos\left(\frac{2\pi kn}{N}\right) - \sin\left(\frac{2\pi kn}{N}\right)$$

instead of $$\cos\left(\frac{2\pi kn}{N}\right) - i\sin\left(\frac{2\pi kn}{N}\right).$$

The Hartley transform produces real output for a real input, and, apart from a scaling factor, is its own inverse. It, therefore, can have computational advantages over the discrete Fourier transform, although analytic expressions are usually more complicated for the Hartley transform.

According to an embodiment of the invention, sinograms are binned into parallel-beam projections. In an X-ray CT scanner, this is one approach to representing the CT data, with a different sinogram for each tomographic slice. The sinogram array at index (ir,iφ) represents the following quantity for each sample of the sinogram space:

$$S(ir, i\varphi) = \ln\left(\frac{air(ir, i\varphi)}{tx(ir, i\varphi)}\right),$$

where air(ir,iφ) is a calibration scan acquired with no patient present, and tx(ir,iφ) is the patient scan. In this equation, ir represents the sinogram's radial coordinate and iφ the angle coordinate. It is assumed that there are nr radial bins and nφ angle bins. The sinogram is sometimes referred to as a projection measurement. In the following description, the metaphor of left and right is used to describe the sinogram's radial dimension, and the metaphor of top and bottom to describe the angular dimension.

Figure 4:
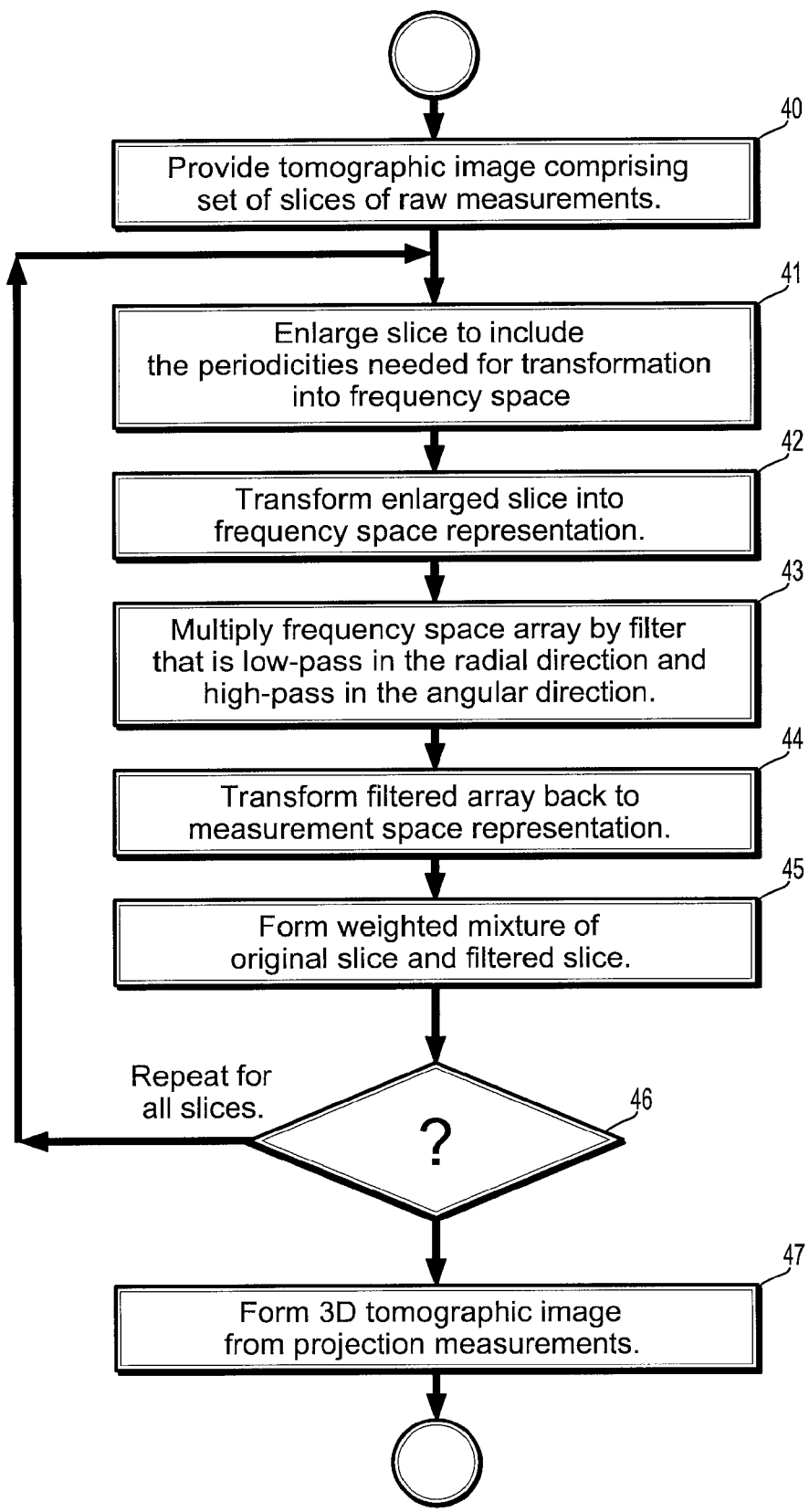
FIG. 4 is a flowchart of a method for reducing ring and band errors in tomographic images, according to an embodiment of the invention.

FIG. 4 is a flow chart of an artifact reducing method according to an embodiment of the invention. The exemplary method described in connection with this flowchart makes use of a transformation of the sinogram data into frequency space, this transformation is optional, and is presented herein for expository purposes only. Referring now to the flowchart, a sinogram comprising a set of slices of raw tomographic measurements is provided at step 40, and in a first step 41, a sinogram slice is enlarged to include the periodicities that allow a valid transformation into frequency space. This means that the contents of the leftmost radial bin must equal the contents expected one bin to the right of the rightmost radial bin, and that the contents of first angle bin must equal the contents expected one bin beyond the last angle bin. According to an embodiment of the invention, these periodicities are enforced after the left and right sides of the measurement subsets (representing discrete detectors in the case of X-ray CT, or radial bins in the case of PET) are made approximately equivalent to each other, while the upper and lower edges of the measurement space (representing angular views) are made approximately equivalent to each other.

It is well understood by applied mathematicians that this approximate equivalence of the left and right, top and bottom edges of a space is a prerequisite for transforming into a discretely sampled frequency space without introducing spurious components into the transformation. Techniques for making left and right sides equivalent include: (a) using the measurements without modification, in the expectation that measured values fall nearly to zero at the edges; (b) padding with zeroes at the edges; and (c) reflecting the dataset horizontally and vertically, or equivalently, radially reversing the sinogram and then reversing the sinogram about the center of rotation. Option (a) is a practical and rapidly computed approach.

According to another embodiment of the invention, these periodicities can enforced as in option (c) by creating a new 2-dimensional array with (2 nr) radial bins and (2 nφ) angle bins. The lower left quarter of the new sinogram (radial indices 0 to (nr−1) and angle indices 0 to (nφ−1)) are used to store the sinogram. The lower right half of the array (same angle indices but radial indices nr to (2 nr−1)) contains a radially reversed version of the sinogram. The upper half of the new array (all radial indices and the angle indices nφ to (2 nφ−1)) is the same as the bottom half except that the sinograms are reversed around the center of rotation to represent the complementary angles 180 to 360 degrees.

At step 42, the array slice is transformed into frequency space be a 2D frequency transform, denoted as Ŝ(kr,kφ), where kr, kφ are the frequency indices.

At step 43, the zero-angular frequency row of the array slice is multiplied by a filter whose behavior is low-pass in the radial direction and high-pass in the angle direction. An exemplary radial filter has the functional form $$f(\rho) = \frac{1}{1 + \left(\frac{\rho}{\rho_0}\right)^{2 \times order}},$$

where ρ is the radial frequency and $\rho_0$ is a cutoff frequency.

The above filter is an example of a Butterworth filter, a type of linear analog signal filter whose frequency response is maximally flat (has no ripples) in the pass-band, and rolls off towards zero in the stop-band. Butterworth filters have a monotonically decreasing magnitude function with frequency.

Rows corresponding to higher angular frequencies, up to an angular frequency cutoff, are multiplied by a filter of the form $$\frac{i}{angle\_cutoff} + \left(1 - \frac{i}{angle\_cutoff}\right) \times f(\rho),$$

where i is and angular frequency row index.

The functional form of a exemplary, non-limiting combined filter that can be applied to the entire frequency domain array slice is:

$$F(kr, k\varphi) = 1 - \left(1 - \frac{1}{1 + \left(\frac{|((kr+nr)\mod(2 \times nr)) - nr|}{kr_0}\right)^{2 \times order}}\right) \times \Lambda\left(\frac{k\varphi \mod(2 \times n\varphi)}{k\varphi_0}\right)$$

that is, one minus the product of a radial Butterworth filter and an angular lambda function, which is defined by $$\Lambda(arg) = \begin{cases} 1 - |arg| & \text{where } |arg| < 1 \\ 0 & \text{elsewhere} \end{cases}.$$

This filter has the following adjustable parameters. The parameter order adjusts the steepness of the Butterworth filter's edge. An exemplary, non-limiting value is order=7. The parameter $kr_0$ adjusts the radial cutoff frequency. An exemplary, non-limiting value is $kr_0$=0.035×(Nyquist frequency), where the Nyquist frequency is 1/(2×dx) where dx is the distance between measurement samples, that is, $kr_0$=0.035× nr. The parameter $k\phi_0$ adjusts the angular cutoff frequency. An exemplary, non-limiting value is $k\phi_0$=4.

According to an embodiment of the invention, the application of the filter can be performed by multiplication in frequency space: S'(kr, kφ)=Ŝ(kr, kφ)×F(kr, kφ). However, according to other embodiments of the invention, the filter can be applied by multiplication and convolution in measurement configuration space, without transforming to frequency space and back.

At step 44, for the embodiment in which the sinogram is transformed into frequency space, the filtered image slice is transformed back into the configuration space of the sinogram. In an embodiment using a Hartley transform, this can be performed by applying the Hartley transform again, multiplying by the appropriate constant factors, then extracting the array S'(ir,iφ) from the lower left corner of the array.

Finally, at step 45, a weighted sum of the modified sinogram slice and the original sinogram slice is created:

$$S''(ir, i\phi) = w(ir) \times S'(ir, i\phi) + (1 - w(ir)) \times S(ir, i\phi).$$

According to an embodiment of the invention, the weighting function that controls the blending of the modified sinogram with the original sinogram is chosen to be another Butterworth filter of the form $$w(ir) = \frac{1}{1 + \left(\frac{|ir - \text{center}|}{ir_0}\right)^{2 \times order}},$$

where center represents the sinogram center. An exemplary weighting filter takes on values near 1.0 at the center of the image, near 0.0 at the edges, and falls through the halfway point halfway to the edge of the image.

In an exemplary, non-limiting implementation, the blending function's parameters are chosen with order=7 and $ir_0 = 0.4 \times nr/2$, so that at 40% of the nominal radius the image is blended with half of the modified image and half of the original image.

Steps 41 to 45 are repeated at step 46 for all slices in the tomographic image. At step 47, a 3D tomographic image is reconstructed from the weighted mixture of sinogram arrays.

The image reconstruction has been described as a step that follows the blending of the modified and unmodified sinograms. Alternatively, according to other embodiments of the invention, reconstruction of the tomographic image can be performed separately on the modified and unmodified sinograms, then a weighted sum of the two images can be formed.

According to an embodiment of the invention, it is not necessary to work with 180 degree parallel-beam sinograms. For example, one could process 360-degree sinograms or very long segments of a helical sinogram. It is also not necessary for the sinograms to be binned to the parallel-beam representation, since the same types of filters can be applied in fan-beam coordinates. Although the filtration is described as a frequency-space operation, according to another embodiment of the invention, these operations can be equivalently performed in normal configuration space by convolving the measured data array with appropriately chosen filters.

Figure 3A:
FIGS. 3(*a*)-(*c*) depict a slice through a patient with standard processing, filtered according to an embodiment of the invention, and a weighted sum of the filtered slice and the original slice.
Figure 3B:
Figure 3C:

FIGS. 3(*a*)-(*c*) depicts a slice through a patient with standard processing shown in FIG. 3(*a*), filtered according to an embodiment of the invention in FIG. 3(*b*), and a weighted sum of the filtered and original slice in FIG. 3(*c*). The slice used for FIG. 3(*a*) is taken from a 180-degree sinogram from a CT scanner with 1289 radial elements and 600 angular samples. The sinogram was inserted into a new array with 2048 radial elements so that a frequency space reconstruction can be performed. The frequency space array was process with a filter according to an embodiment of the invention, using a radial cutoff frequency parameter of 0.035%Nyquist frequency and the default angular cutoff frequency of 4 cycles. This array is displayed in FIG. 3(*b*). Although rings have been suppressed in this new image, new ring artifacts have appeared, as indicated by the three arrows. These artifacts arise due to the success of the filter in finding circular structures that are actually present, such as a round belly and muscles in the back. These rings occur mainly in the middle of the image, and for a given gain error, the ring intensity varies approximately as $1/\sqrt{\text{radius}}$. The weighted sum using another Butterworth filter weighting function can then substantially eliminate these new artifacts. The image displayed in FIG. 3(*c*) was obtained using a $3^{rd}$-order Butterworth filter weighting function of the form $$w(r) = \frac{1}{1 + \left(\frac{r}{0.25 \times W}\right)^6},$$

where r is the distance from the center of the image, in pixels, and W is the width of the image in pixels.

The parameter values and filter forms in the embodiments described in connection with the flowchart of FIG. 4 are exemplary, and those skilled in the art will know that different parameter values and other similarly shaped filters will come within the scope of an embodiment of the invention. The efficacy of an embodiment of the invention does not depend on knowing the statistics of the sampled data, such as the use of a parallel-beam sinogram of logarithm values, or on transformations to frequency space.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 5:
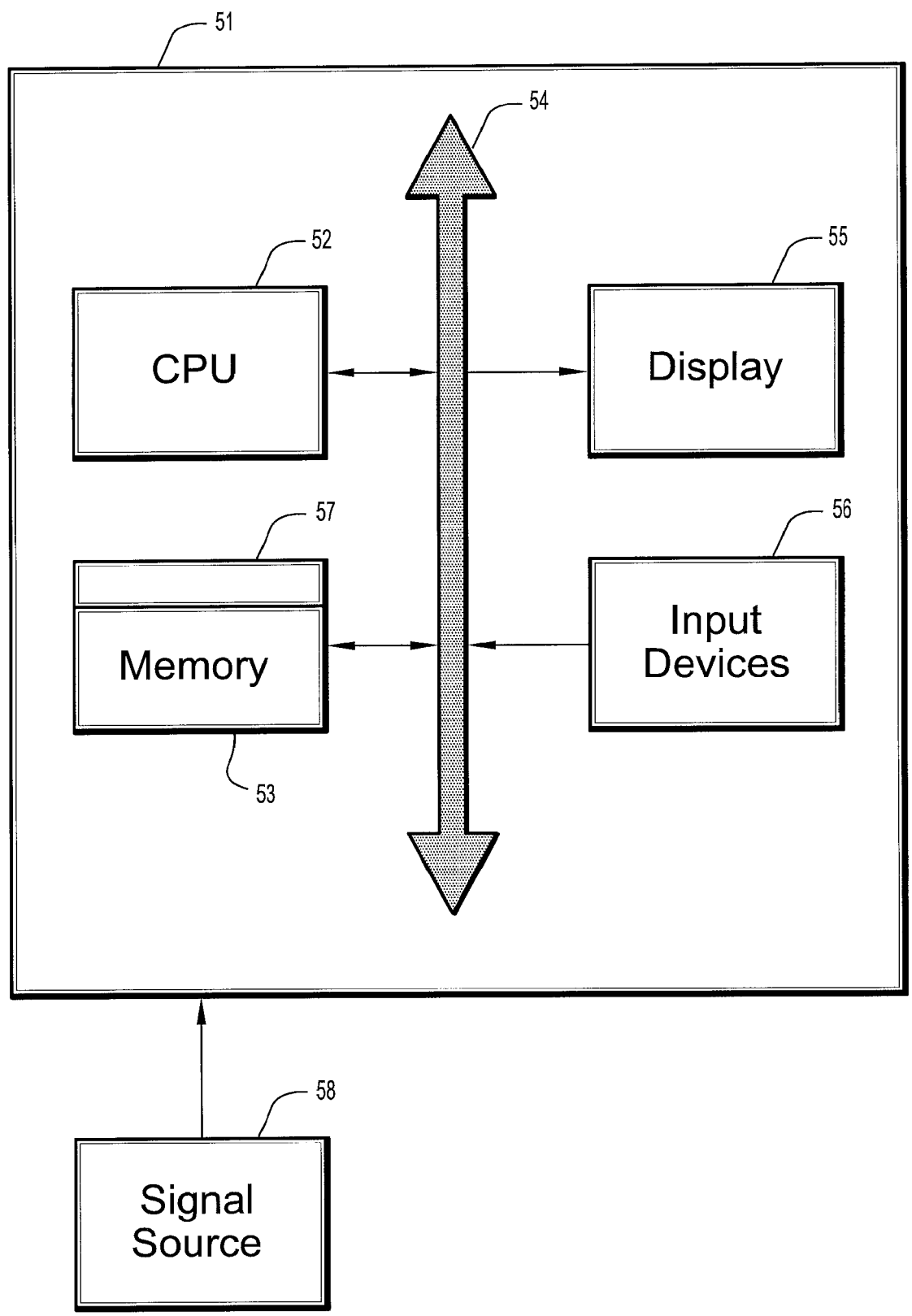
FIG. 5 is a block diagram of an exemplary computer system for implementing a method for reducing ring and band errors in tomographic images, according to an embodiment of the invention.

FIG. 5 is a block diagram of an exemplary computer system for implementing a method for reducing ring and band errors in tomographic images, according to an embodiment of the invention. Referring now to FIG. 5, a computer system 51 for implementing the present invention can comprise, inter alia, a central processing unit (CPU) 52, a memory 53 and an input/output (I/O) interface 54. The computer system 51 is generally coupled through the I/O interface 54 to a display 55 and various input devices 56 such as a mouse and a keyboard. The support circuits can include circuits such as cache, power supplies, clock circuits, and a communication bus. The memory 53 can include random access memory (RAM), read only memory (ROM), disk drive, etc., or a combination thereof. The present invention can be implemented as a routine 57 that is stored in memory 53 and executed by the CPU 52 to process the signal from the signal source 58. As such, the computer system 51 is a general purpose computer system that becomes a specific purpose computer system when executing the routine 57 of the present invention.

The computer system 51 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of reducing ring artifacts in tomographic images comprising the steps of:
   providing an original digitized projection measurement comprising a plurality of intensities corresponding to a domain of points on an 2-dimensional grid;
   operating on said original projection measurement with a filter wherein features of high radial frequency and low angular frequency are attenuated;
   forming a weighted mixture of said filtered projection measurement and said original projection measurement wherein ring artifacts in said original tomographic image are substantially reduced;
   reconstructing the projection measurement to form a tomographic image, and
   wherein operating on said original projection measurement comprises transforming said original projection measurement from a measurement space representation into a frequency space representation, filtering said frequency space representation, and transforming filtered frequency space representation back to the measurement space representation.

2. The method of claim 1, wherein said projection measurement is an X-ray projection measurement from a computed tomography instrument.

3. The method of claim 2, wherein said X-ray projection measurement has been interpolated to form a parallel-beam 180-degree sinogram.

4. The method of claim 2, wherein said X-ray projection measurement has been interpolated to form a parallel-beam 360-degree sinogram.

5. The method of claim 2, wherein said X-ray projection measurement has been interpolated to form a fan-beam projection sinogram.

6. The method of claim 1, wherein operating on said original projection measurement comprises convolving said original projection measurement with said filter.

7. The method of claim 1, further comprising enlarging said original projection measurement, wherein periodicities needed for a valid transformation into a frequency space representation are provided.

8. The method of claim 7, wherein enlarging said original projection measurement comprises radially reversing the original projection measurement and reversing the radially reversed projection measurement about a center of rotation.

9. The method of claim 7, wherein enlarging said original projection measurement comprises padding the original projection measurement with zeroes at the edges.

10. The method of claim 1, wherein said transformation to frequency space is a Hartley transformation.

11. The method of claim 1, wherein said transformation to frequency space is a Fourier transformation.

12. The method of claim 1, wherein said filter is one minus the product of a radial Butterworth filter and an angular lambda function, said filter equivalent to the form $$1 - \left(1 - \frac{1}{1 + \left(\frac{|((kr + nr)\bmod(2 \times nr)) - nr|}{kr_0}\right)^{2 \times N}}\right) \times \Lambda\left(\frac{k\varphi \bmod(2 \times n\varphi)}{k\varphi_0}\right)$$

wherein $\Lambda(\text{arg}) = \begin{cases} 1 - |\text{arg}| & \text{where } |\text{arg}| < 1 \\ 0 & \text{elsewhere} \end{cases}$, and wherein kr and kϕ are frequency space analogues of radial and angular coordinates, respectively, nr and nϕ are the number of radial and angular bins, respectively, N is a predetermined exponent that adjusts the steepness of the filter edge, $kr_0$ adjusts the radial cutoff frequency, and $k\phi_0$ adjusts the angular cutoff frequency.

13. The method of claim 1, wherein said weighted mixture of said filtered projection measurement and said original projection measurement is equivalent to the form $$w(ir) \times S'(ir, i\phi) + (1 - w(ir)) \times S(ir, i\phi),$$

wherein S(ir, iϕ) is the original projection measurement, S'(ir, iϕ) is the filtered projection measurement, ir and iϕ represent radial and angular coordinates, respectively, and w(ir) is a weighting function that is a Butterworth filter equivalent to the form $$\frac{1}{1 + \left(\frac{|ir - \text{center}|}{ir_0}\right)^{2 \times N}},$$

wherein center represents the original projection measurement center, N is a predetermined exponent that adjusts the steepness of the filter edge, and $ir_0$ adjusts the radial cutoff value.

14. A method of reducing ring artifacts in tomographic images comprising the steps of:
   providing an original digitized projection measurement comprising a plurality of intensities corresponding to a domain of points on an 2-dimensional grid;
   filtering said projection measurement image with a filter that is a low-pass filter in the radial direction at near-zero angular frequency, passes all frequencies at high angular frequencies, and changes linearly between said two behaviors at intermediate angular frequencies;
   reconstructing a first tomographic image from said original projection measurement;
   reconstructing a second tomographic image from said filtered projection measurement; and
   forming a weighted mixture of said first tomographic image and said second tomographic image wherein ring artifacts resulting from said original projection measurement are substantially reduced.

15. The method of claim 14, wherein said near-zero-angular-frequency low pass radial filter is equivalent to $$\frac{1}{1 + \left(\frac{\rho}{\rho_0}\right)^{2N}}$$

wherein ρ is a radial value, $\rho_0$ is a cutoff radius, and N is a predetermined exponent value.

16. The method of claim 15, wherein said filter for non-zero angular frequencies is equivalent to $$\frac{i}{i_0} + \left(1 - \frac{i}{i_0}\right) \times f(\rho),$$

wherein f(ρ) is said near-zero-angular-frequency radial filter, i is an angular value and $i_0$ is an angular cutoff.

17. A program storage device readable by a computer, tangibly embodying a program of instructions executable by the computer to perform the method steps for reducing ring artifacts in tomographic images, said method comprising the steps of:
provide an original digitized projection measurement comprising a plurality of intensities corresponding to a domain of points on an 2-dimensional grid;
operating on said original projection measurement with a filter wherein features of high radial frequency and low angular frequency are attenuated;
forming a weighted mixture of said filtered projection measurement and said original projection measurement wherein ring artifacts in said original tomographic image are substantially reduced;
reconstructing the projection measurement to form a tomographic image, and wherein operating on said original projection measurement comprises transforming said original projection measurement from a measurement space representation into a frequency space representation, filtering said frequency space representation, and transforming filtered frequency space representation back to the measurement space representation.

18. The computer readable program storage device of claim 17, wherein said projection measurement is an X-ray projection measurement from a computed tomography instrument.

19. The computer readable program storage device of claim 18, wherein said X-ray projection measurement has been interpolated to form a parallel-beam 180-degree sinogram.

20. The computer readable program storage device of claim 18, wherein said X-ray projection measurement has been interpolated to form a parallel-beam 360-degree sinogram.

21. The computer readable program storage device of claim 18, wherein said X-ray projection measurement has been interpolated to form a fan-beam projection sinogram.

22. The computer readable program storage device of claim 17, wherein operating on said original projection measurement comprises convolving said original projection measurement with said filter.

23. The computer readable program storage device of claim 22, the method further comprising enlarging said original projection measurement, wherein periodicities needed for a valid transformation into a frequency space representation are provided.

24. The computer readable program storage device of claim 23, wherein enlarging said original projection measurement comprises radially reversing the original projection measurement and reversing the radially reversed projection measurement about a center of rotation.

25. The computer readable program storage device of claim 23, wherein enlarging said original projection measurement comprises padding the original projection measurement with zeroes at the edges.

26. The computer readable program storage device of claim 17, wherein said transformation to frequency space is a Hartley transformation.

27. The computer readable program storage device of claim 17, wherein said transformation to frequency space is a Fourier transformation.

28. The computer readable program storage device of claim 17, wherein said filter is one minus the product of a radial Butterworth filter and an angular lambda function, said filter equivalent to the form $$1 - \left(1 - \frac{1}{1 + \left(\frac{|((kr+nr)\bmod(2\times nr)) - nr|}{kr_0}\right)^{2\times N}}\right) \times \Lambda\left(\frac{k\varphi \bmod(2\times n\varphi)}{k\varphi_0}\right)$$

$$\text{wherein } \Lambda(\text{arg}) = \begin{cases} 1 - |\text{arg}| & \text{where } |\text{arg}| < 1 \\ 0 & \text{elsewhere} \end{cases},$$

and wherein kr and kφ are frequency space analogues of radial and angular coordinates, respectively, nr and nφ are the number of radial and angular bins, respectively, N is a predetermined exponent that adjusts the steepness of the filter edge, $kr_0$ adjusts the radial cutoff frequency, and $k\varphi_0$ adjusts the angular cutoff frequency.

29. The computer readable program storage device of claim 17, wherein said weighted mixture of said filtered projection measurement and said original projection measurement is equivalent to the form $$w(ir) \times S'(ir, i\phi) + (1 - w(ir)) \times S(ir, i\phi),$$

wherein S(ir, iφ) is the original projection measurement, S'(ir, iφ) is the filtered projection measurement, ir and iφ represent radial and angular coordinates, respectively, and w(ir) is a weighting function that is a Butterworth filter equivalent to the form $$\frac{1}{1 + \left(\frac{|ir - \text{center}|}{ir_0}\right)^{2\times N}},$$

wherein center represents the original projection measurement center, N is a predetermined exponent that adjusts the steepness of the filter edge, and $ir_0$ adjusts the radial cutoff value.

* * * * *